United States Patent
Çaldichoury et al.

(10) Patent No.: US 11,238,195 B2
(45) Date of Patent: Feb. 1, 2022

(54) CONFIGURING RESISTANCE SPOT WELDING SETUP BASED ON NUMERICAL SIMULATION RESULTS

(71) Applicant: Livermore Software Technology Corporation, Livermore, CA (US)

(72) Inventors: Iñaki Çaldichoury, Pleasanton, CA (US); Pierre L'Eplattenier, Livermore, CA (US)

(*) Notice: Subject to any disclaimer, the term of this patent is extended or adjusted under 35 U.S.C. 154(b) by 363 days.

(21) Appl. No.: 16/392,489

(22) Filed: Apr. 23, 2019

(65) Prior Publication Data

US 2020/0342069 A1    Oct. 29, 2020

(51) Int. Cl.
  *G06F 30/23*    (2020.01)
  *G06F 119/08*   (2020.01)
  *B23K 11/11*    (2006.01)

(52) U.S. Cl.
  CPC .............. *G06F 30/23* (2020.01); *B23K 11/11* (2013.01); *G06F 2119/08* (2020.01)

(58) Field of Classification Search
  CPC .. G06F 30/23; G06F 2119/08; G06F 2119/18; B23K 11/11; B23K 11/255; B23K 11/115; Y02P 90/02
  USPC .......................................................... 703/2
  See application file for complete search history.

(56) References Cited

U.S. PATENT DOCUMENTS

2012/0209546 A1* 8/2012 Vervaeke ............... G01R 33/10
                                                         702/57

OTHER PUBLICATIONS

Pierre L'Eplattenier et al., "Resistive Spot Welding Simulations Using LS-DYNA", 2017, 11th European LS-DYNA Conference, 10 pages.*
Matthew Galler et al., "Simulation based determination of the electrical contact resistance during resistance spot welding", 2010, 18 pages.*
Michael Piott et al., "Electrical contact resistance model for aluminum resistance spot welding", 2019, Mathematical Modelling of Weld Phenomena 12, 18 pages.*
Ullah, et al. "Three-Dimensional Contact Formulation: An Efficient and Accurate Numerical Implementation", Proceedings of the 25th UKACM Conference on Computational Mechanics, Apr. 12, 2017, Birmingham, UK.

(Continued)

*Primary Examiner* — Juan C Ochoa (57) ABSTRACT

FEA model representing a RSW setup is defined and received in a computer system. The FEA model contains multiple solid elements representing a pair of electrodes and two workpieces. Numerically-calculated heat-power distributions and structural behaviors of the workpieces are obtained by conducting a time-marching simulation using FEA model with a set of time-dependent electrode forces and corresponding set of time-dependent electrical current. An overlapped contact area and corresponding contact center between first and second element contact faces of each of the solid element pairs in contact are determined. Respective elemental coordinates of the contact center in the first and second element contact faces are calculated. Augmented terms for Joule heating effects are added to the overall stiffness matrix for obtaining Joule heat rate power at each contact center, which is then distributed to respective corner nodes of the first and second element contact faces according to respective elemental coordinates.

15 Claims, 9 Drawing Sheets

(56) References Cited

OTHER PUBLICATIONS

Wan, et al. "Numerical Simulation of Resistance Spot Welding of Al to Zinc-Coated Steel With Improved Representation of Contact Interactions", International Journal of Heat and Mass Transfer 101 (2016) 749-763.
Alexander Popp, "Motar Methods For Computational Contact Mechanics and General Interface Problems", Ph. D. Dissertation, Technische Universitat Muchchen, Jun. 28, 2012.

* cited by examiner

CONFIGURING RESISTANCE SPOT WELDING SETUP BASED ON NUMERICAL SIMULATION RESULTS

FIELD

This patent document generally relates to computer-aided engineering analysis of resistance spot welding (RSW), more particularly to configuring resistance spot welding setup based on numerical simulation results.

BACKGROUND

Resistance spot welding is a process in which contacting metal surface points are joined by the heat obtained from resistance to electric current. Workpieces are held together under pressure exerted by electrodes. The process uses two shaped electrodes to concentrate welding current into a small "spot" and to simultaneously clamp the sheets together. Forcing a large current through the spot will melt the metal and form the weld. The attractive feature of spot welding is that a lot of energy can be delivered to the spot in a very short time (approximately 10-100 milliseconds). That allows the welding to occur without excessive heating of the remainder of the sheet. The amount of heat (energy) delivered to the spot is determined by the resistance between the electrodes and the magnitude and duration of the current. The amount of energy is chosen to match the sheet's material properties, its thickness, and type of electrodes. Applying too little energy will not melt the metal or will make a poor weld. Applying too much energy will melt too much metal, eject molten material, and make a hole rather than a weld.

Many modern engineering analyses are performed with the aid of a computer system. One of such computer aided engineering (CAE) analyses is referred to as finite element analysis (FEA) or finite element method (FEM). FEA is a computer implemented method widely used in industry to model and solve engineering problems relating to complex systems such as three-dimensional, non-linear structural design, and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells, and beams of various sizes, which are called elements. The vertices of the elements are referred to as nodes. The model is comprised of a finite number of elements, which are assigned a material identifier to associate with its material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

BRIEF SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems and methods of configuring physical resistance spot welding (RSW) setup based on numerical simulation results are disclosed. According to one aspect of the disclosure, a finite element analysis (FEA) model representing a RSW setup is defined and received in a computer system. The FEA model contains multiple solid elements representing a pair of electrodes and two workpieces. Numerically-calculated heat-power distributions and structural behaviors of the workpieces are obtained by conducting a time-marching simulation using FEA model with a set of time-dependent electrode forces and corresponding set of time-dependent electrical current. An overlapped contact area and corresponding contact center between first and second element contact faces of each of the solid element pairs in contact are determined. Respective elemental coordinates of the contact center in the first and second element contact faces are calculated. Augmented terms for Joule heating effects are added to the overall stiffness matrix for obtaining Joule heating rate power at each contact center, which is then distributed to respective corner nodes of the first and second element contact faces according to respective elemental coordinates.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1A-8. However, those skilled in the art will readily appreciate that the detailed description given herein with respect to these figures is for explanatory purposes as the invention extends beyond these limited embodiments.

Figure 1A:
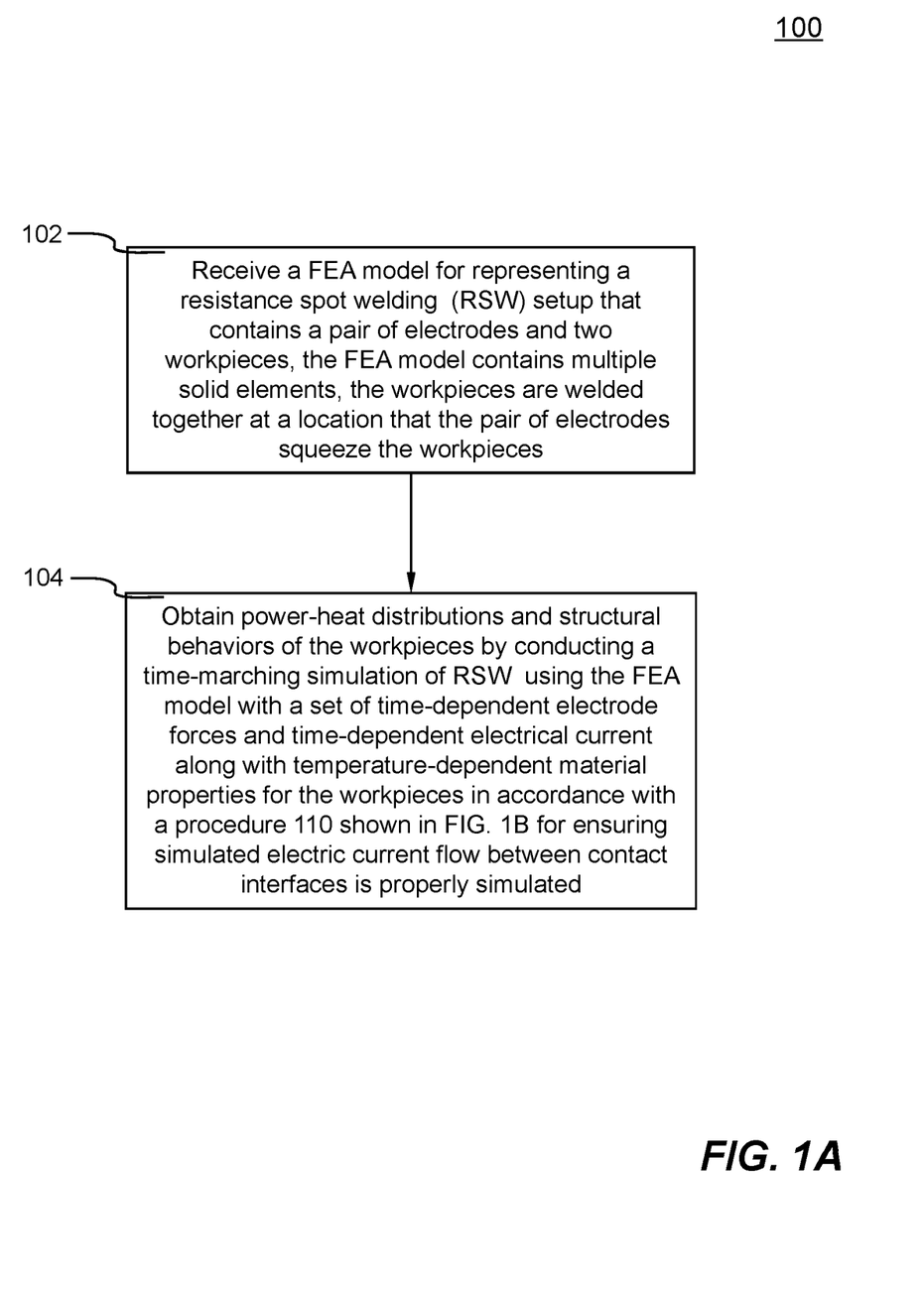
FIGS. 1A-1B collectively show a flowchart illustrating an example process of configuring resistance spot welding (RSW) setup based on numerical simulation results, according to one embodiment of the invention.
Figure 1B:
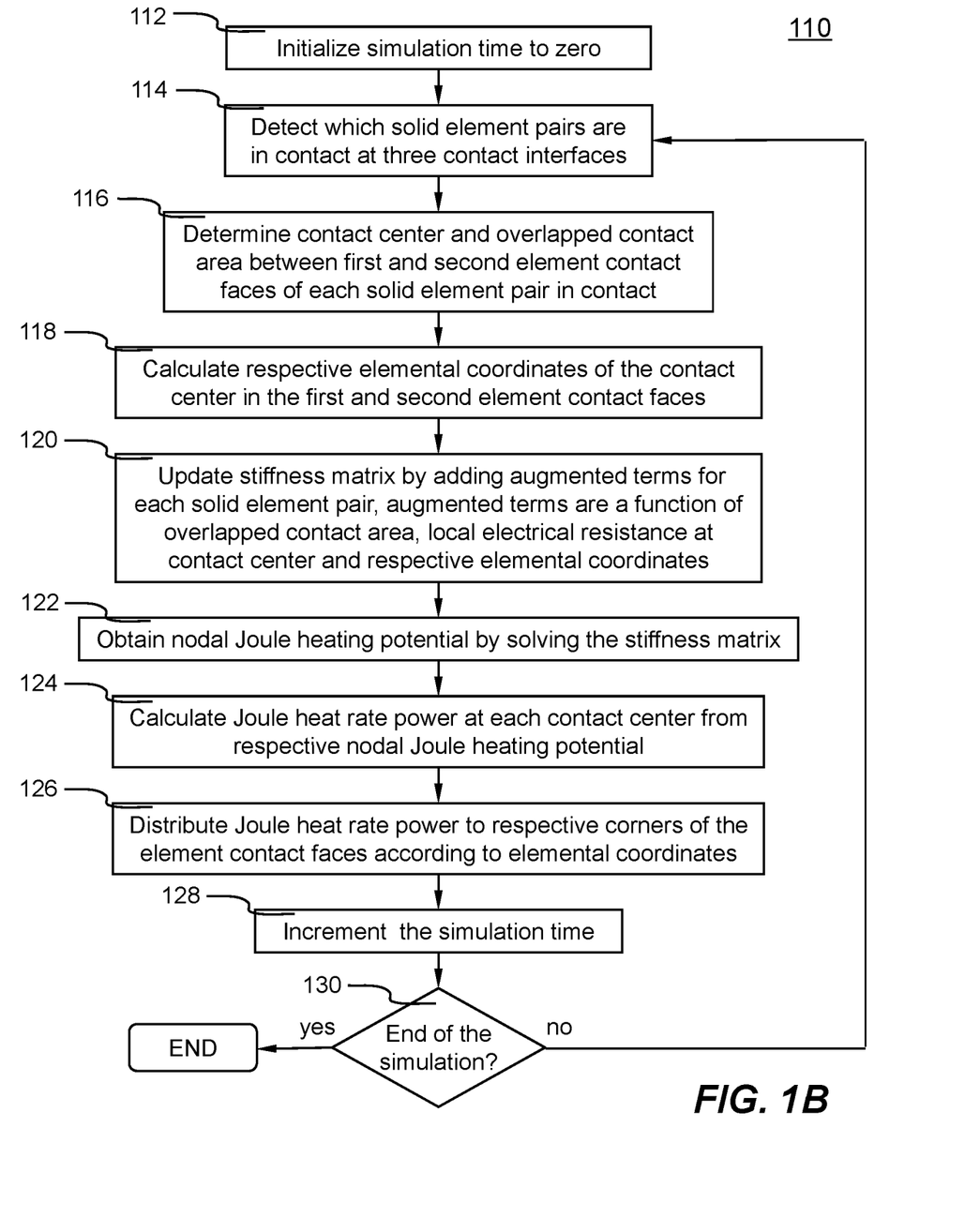

Referring first to FIGS. 1A-1B, it is shown a flowchart illustrating an example process 100 of numerically simulating a resistance spot welding (RSW) setup. Process 100 is implemented in software and preferably understood with other figures.

Process 100 starts by receiving a finite element analysis (FEA) model representing a RSW setup that contains a pair of electrodes and two workpieces in a computer system (e.g., computer 800 in FIG. 8) having a FEA application module installed thereon at action 102. The FEA model contains multiple solid finite elements. The workpieces are welded together at a location the pair of electrodes squeeze the workpieces.

Figure 2:
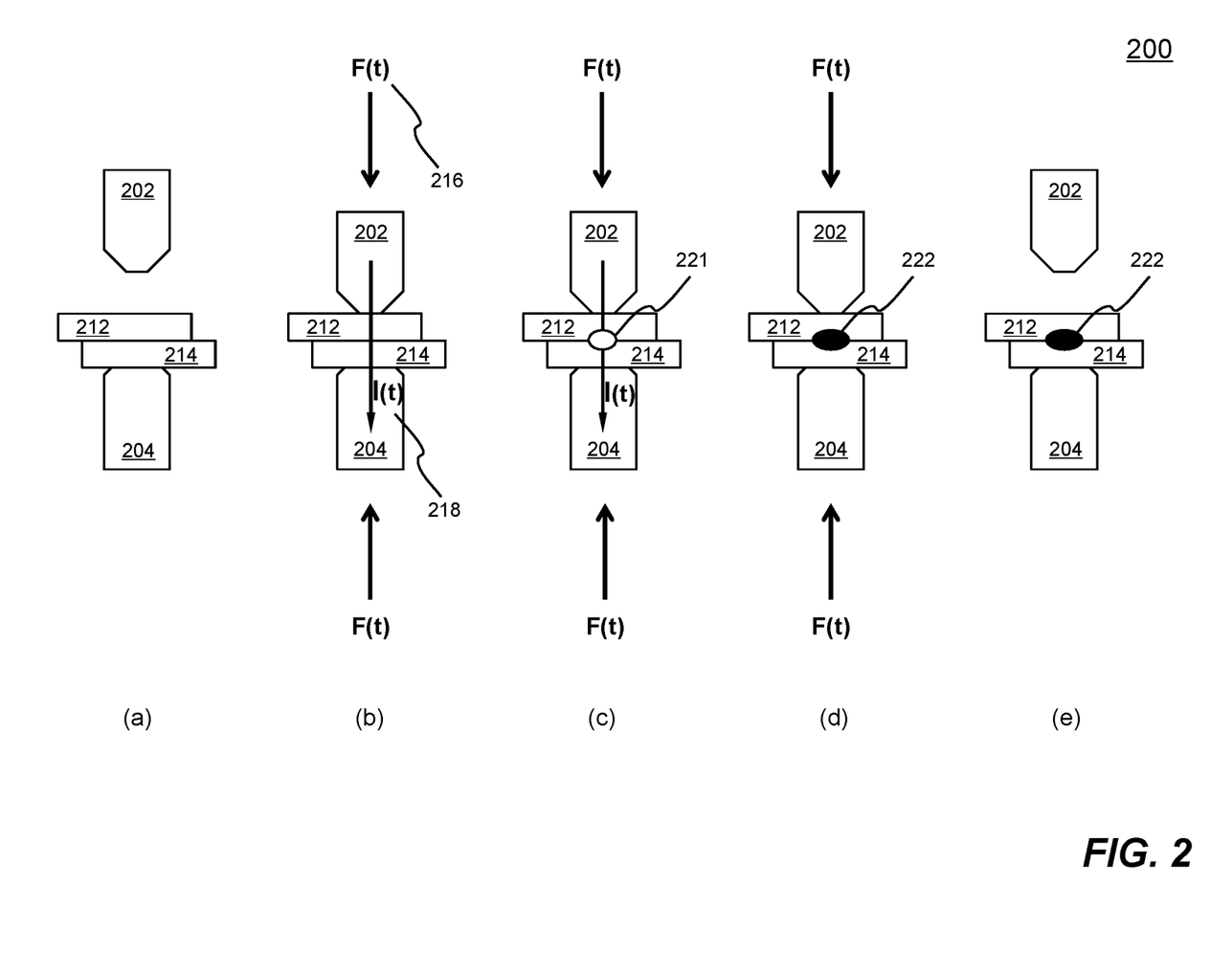
FIG. 2 is a schematic diagram showing an example sequence of RSW according to one embodiment of the invention.

Schematic diagram showing an example RSW sequence 200 is shown in FIG. 2. A pair of electrodes 202-204 are placed on each side of the workpieces 212-214 to be welded in the beginning. A time-dependent electrode force F(t) 216 is then applied on the pair of electrodes 202-204 to create a pressure at three contact interfaces: between the first electrode 202 and the first workpiece 212; between the first workpiece 212 and the second workpiece 214; and between the second workpiece 214 and the second electrode 204.

A time-dependent electrical current I(t) 218 is sent from the first electrode 202 through the workpieces 212-214 to the second electrode 204. As a result of the combined effects of the applied electrode force 216 and the electrical current 218, Joule heating due to contact resistance causes the workpieces 212-214 to melt at the contact to form a molten volume (i.e., hot nugget) 221.

Then the electrical current 218 is removed with the applied force 216 remain for a short period of time such that a spot weld (i.e., welded nugget) 222 is created. Finally, the electrodes 202-204 are released and the workpieces 212-214 are welded together with a welded nugget 222.

Figure 3:
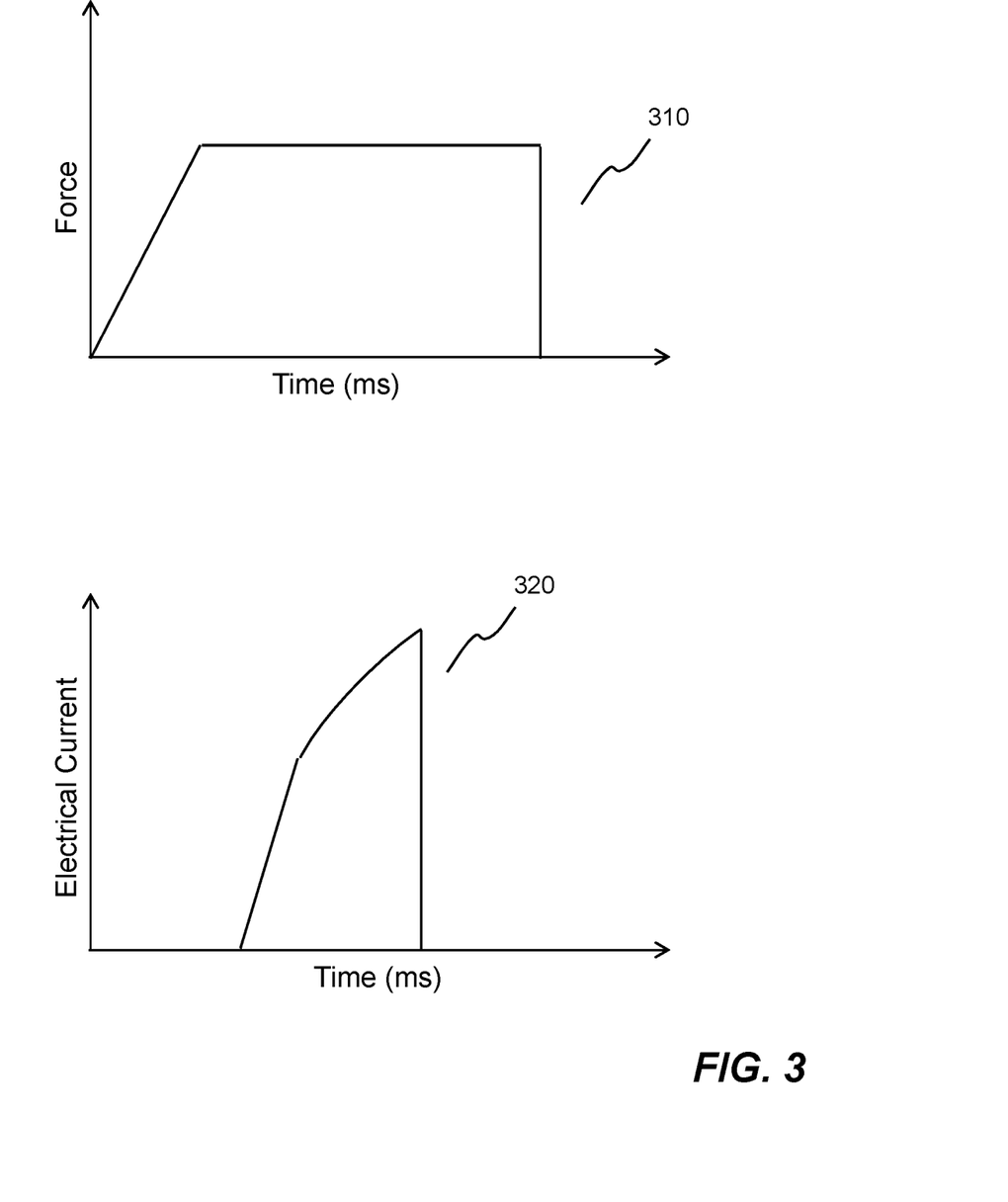
FIG. 3 is a diagram showing an example set of time-dependent electrode force and time-dependent electrical current in accordance with an embodiment of the invention.

FIG. 3 shows an example set of time-dependent electrode force F(t) 310 and time-dependent electrical current I(t) 320. The electrode force 310 starts at zero and reaches a desired magnitude and stays there until the electrodes are released. The electrical current 320 is applied after the desired magnitude of the electrode force has reached. The electrode force 310 remains after the electrical current is stopped.

Figure 4:
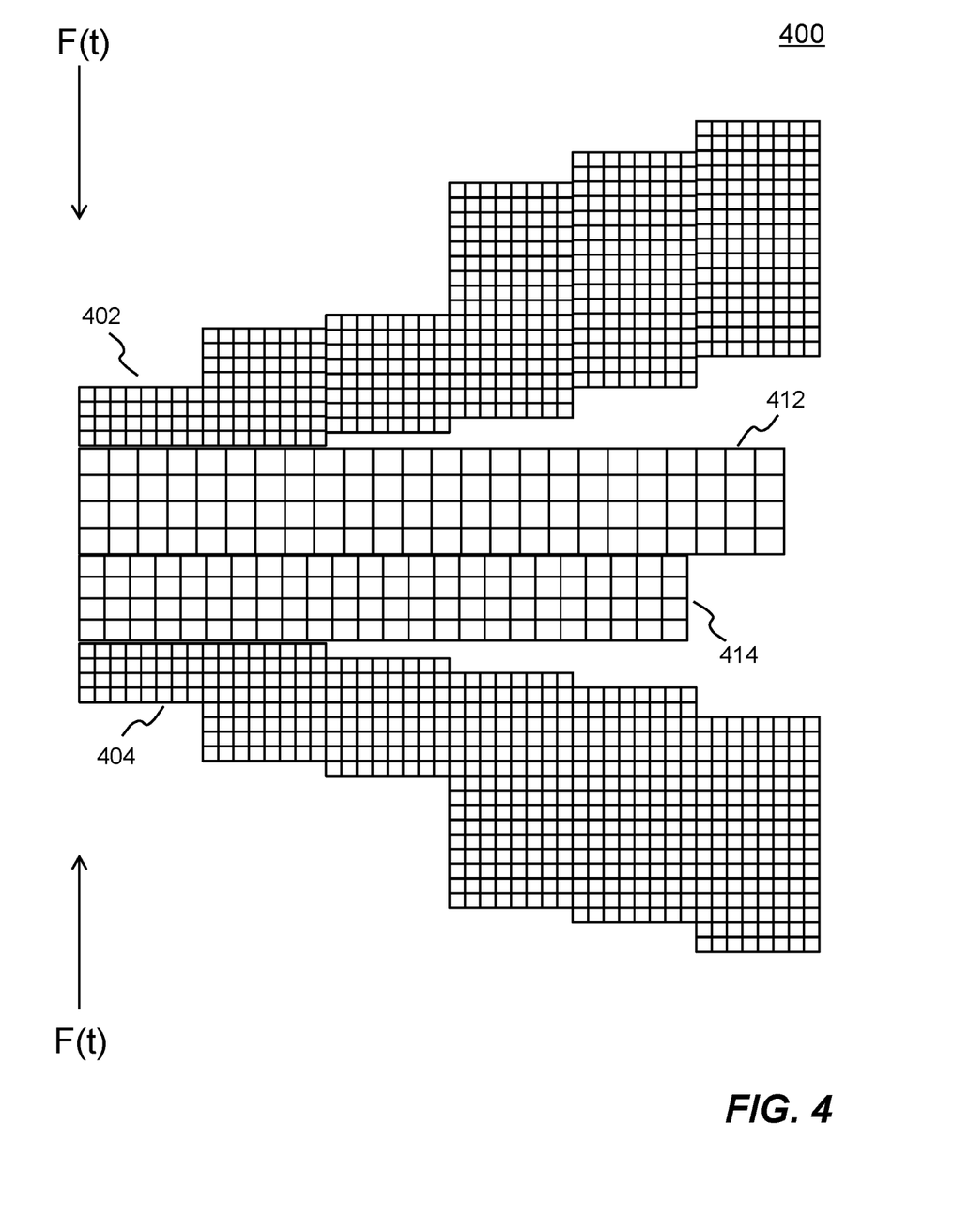
FIG. 4 is a two-dimensional view showing an example partial FEA model of a RSW setup can be numerically simulated by one embodiment of the invention.

In order to numerically simulating the RSW, a FEA model is defined for representing a RSW setup. A two-dimension view of a partial FEA model 400 is shown in FIG. 4. In one embodiment, the FEA model 400 is a three-dimensional model. In another embodiment, the FEA model 400 is an axisymmetric model.

The FEA model 400 includes many solid finite elements (e.g., hexahedral elements) representing first electrode 402, second electrode 404, first workpiece 412, and second workpiece 414.

Referring back to FIG. 1A, at action 104, numerically-calculated structural behaviors and power-heat distributions of the workpieces are obtained by conducting a time-marching simulation of RSW using the FEA model with a set of time-dependent electrode forces and time-dependent electrical current. The material properties of the workpieces and/or electrodes are temperature-dependent. The detailed actions of the time-marching simulation are shown in an example process 110 shown in FIG. 1B to ensure that simulated electrical current flow between contact interfaces is properly simulated.

Process 110 starts at action 112 by initializing the simulation time to zero. Then at three contact interfaces, any and all solid element pairs are in contact are detected at action 114. There are many known techniques for detecting contacts between finite elements in FEA.

Figure 5:
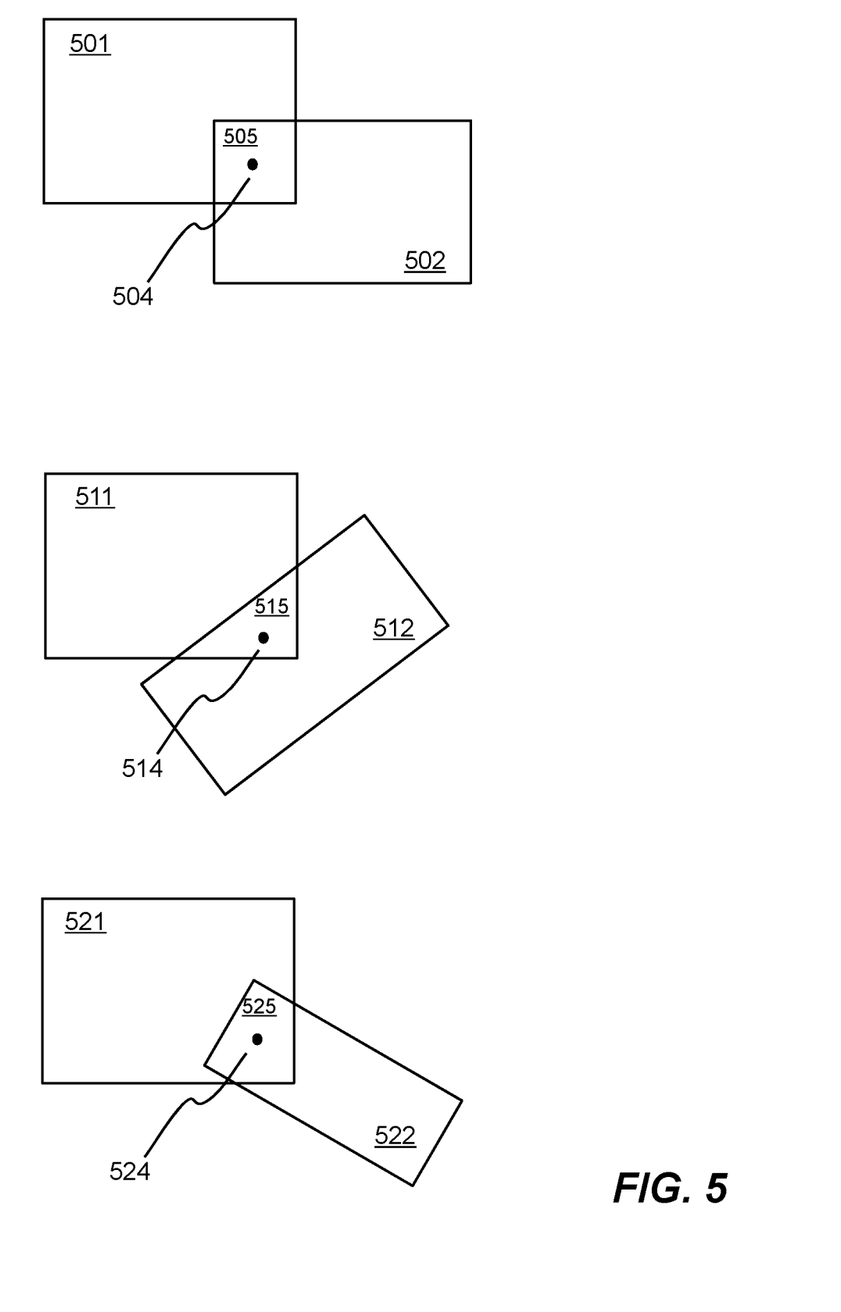
FIG. 5 are diagrams showing various examples of overlapped contact area and corresponding contact center between two element contact faces in accordance with one embodiment of the invention.

Next, at action 116, a contact center and an overlapped contact area between first and second element contact faces of each solid element pairs in contact are determined. Examples of contact center and overlapped contact area are shown in FIG. 5. The first example shows that a rectangular overlapped contact area 505 with a corresponding contact center 504 between the first element contact face 501 and the second element contact face 502. The second example shows a triangular overlapped area 515 with a contact center 514 between first and second element contact faces 511-512. The third example shows a pentagon shape overlapped area 525 with contact center 524 between first and second element contact faces 521-522. In one embodiment, the contact center is the geometric center of the overlapped contact area. The first and second element contact faces are element faces in contact. In one example, a solid element in the first electrode is in contact with another solid element in the first workpiece. In another example, first and second element contact faces belong to the first and second workpieces, respectively. Due to different mesh density of FEA model and deformations during RSW, the overlapped contact area may be changed at each of the many solution cycles of the time-marching simulation.

Figure 6A:
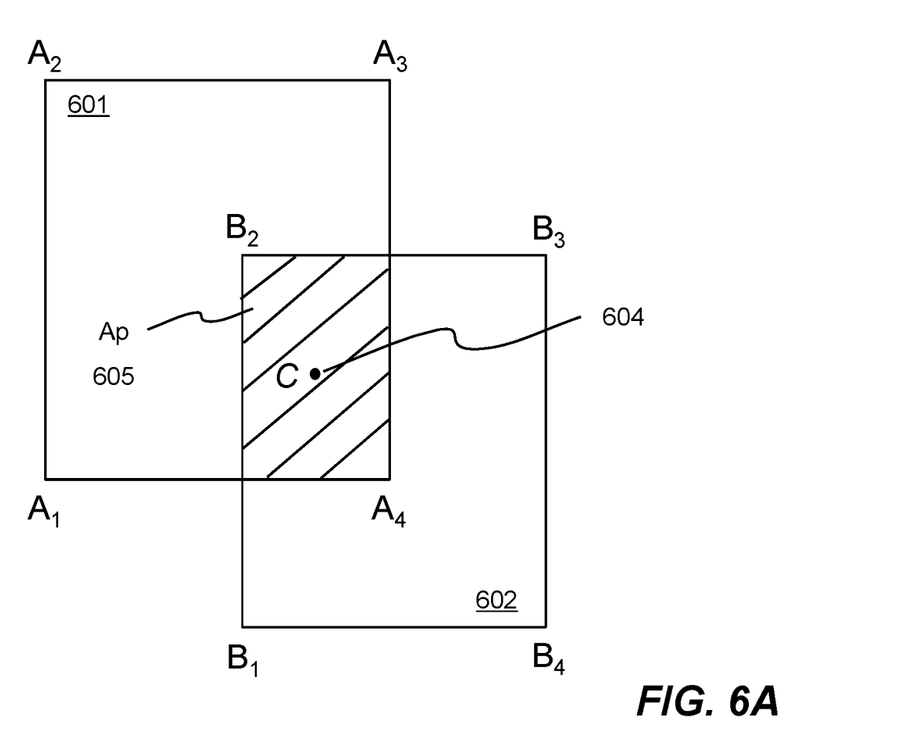
FIGS. 6A-6B are diagrams showing a plan view and a perspective view of two example element contact faces in accordance with one embodiment of the invention
Figure 6B:
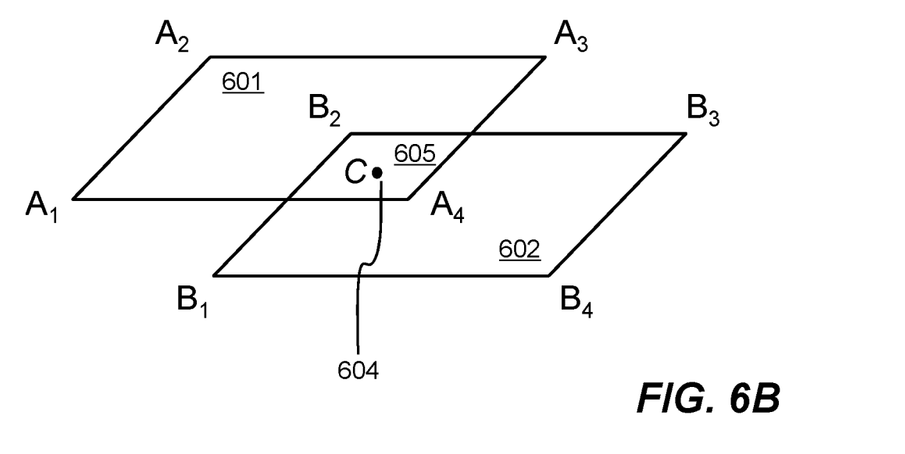

Plan view and perspective view depicting two element contact faces 601-602 are shown in FIG. 6A and FIG. 6B, respectively. The overlapped contact area Ap 605 and corresponding contact center C 604 are shown. The first element contact face 601 is defined by corner nodes $A_1, A_2, A_3, A_4$, while the second element contact face 602 is defined by corner nodes $B_1, B_2, B_3$ and $B_4$.

Figure 7:
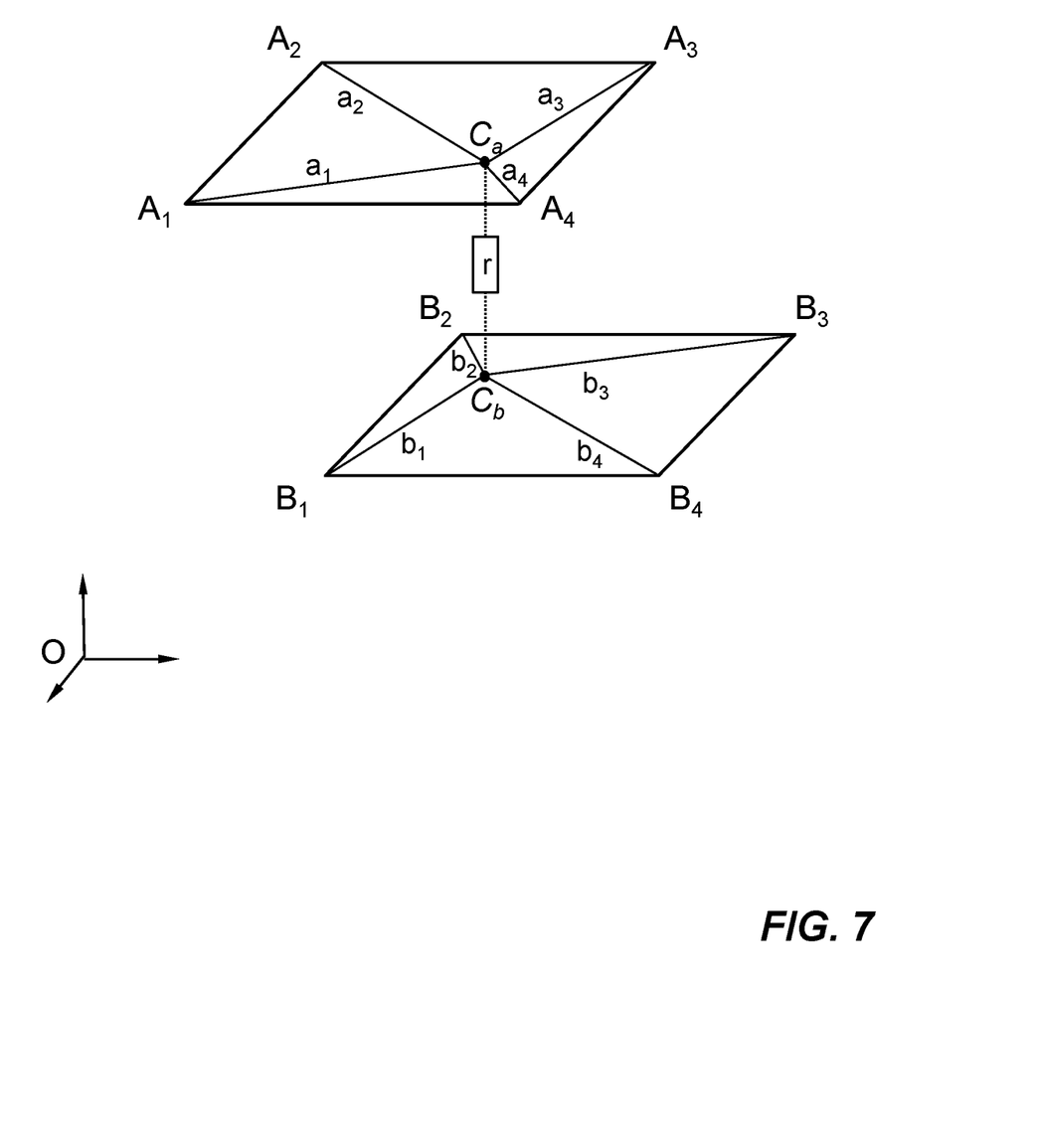
FIG. 7 is a perspective diagram showing example relationship of local electrical resistant between two element contact faces in accordance with one embodiment of the invention.

Referring back to process 110, at action 118, respective elemental coordinates of the contact center are calculated in the first and the second element contact faces. FIG. 7 shows a perspective view of the relationship between the first and second element contact faces including elemental coordinates and local electrical resistance.

Elemental coordinates for contact center are calculated with the following formula $$OC_a \Sigma_{i=1,4} a_i OA_i$$

$$OC_b \Sigma_{i=1,4} b_i OB_i$$

where:
O is the origin of a global coordinate system,
$OC_a$ is a vector from the origin of the contact center $C_a$ of the first element contact face,
$OC_b$ is a vector from the origin of the contact center $C_b$ of the second element contact face,
$OA_i$ is a vector from the origin of respective corner nodes of the first element contact face,
$OB_i$ is a vector from the origin of respective corner nodes of the second element contact face,
$a_i$ are elemental coordinates of the contact center $C_a$;
$b_i$ are elemental coordinates of the contact center $C_b$.

The local electrical resistance r is placed between the respective contact centers $C_a$, $C_b$ of the first and the second element contact faces.

Based on Ohm's law, the local electrical resistance r is represented numerically by adding (1/r) at ($C_a$, $C_a$) and ($C_b$, $C_b$) and by adding (−1/r) at ($C_a$, $C_b$) and ($C_b$, $C_a$) to the stiffness matrix. Then there are two linear constraints in forms of nodal Joule heating potential at contact center as follows:

$$\phi(C_a) = \Sigma_{i=1,4} a_i \phi(A_i)$$

$$\phi(C_b) = \Sigma_{i=1,4} b_i \phi(B_i)$$

where:
$\phi(C_a)$ is the Joule heating potential at contact center of the first element contact face,
$\phi(C_b)$ is the Joule heating potential at contact center of the second element contact face,
$\phi(A_i)$ is the nodal Joule heating potential at respective corner nodes of the first element contact face,
$\phi(B_i)$ is the nodal Joule heating potential at respective corner nodes of the second element contact face.

At action 120, stiffness matrix of the FEA model is updated by adding augmented terms for each solid element pair in contact. The augment terms are a function of overlapped contact area, local electrical resistance at contact center and respective elemental coordinates. Table 1 shows an example 8×8 augmented terms that are equivalent to adding local electrical resistance at contact center between two element contact faces. Each of the 8×8 augmented term is multiplied by [Ap/r].

TABLE 1

| $a_1^2$ | $a_1 a_2$ | $a_1 a_3$ | $a_1 a_4$ | $-a_1 b_1$ | $-a_1 b_2$ | $-a_1 b_3$ | $-a_1 b_4$ |
|---|---|---|---|---|---|---|---|
| $a_2 a_1$ | $a_2^2$ | $a_2 a_3$ | $a_2 a_4$ | $-a_2 b_1$ | $-a_2 b_2$ | $-a_2 b_3$ | $-a_2 b_4$ |
| $a_3 a_1$ | $a_3 a_2$ | $a_3^2$ | $a_3 a_4$ | $-a_3 b_1$ | $-a_3 b_2$ | $-a_3 b_3$ | $-a_3 b_4$ |
| $a_4 a_1$ | $a_4 a_2$ | $a_4 a_3$ | $a_4^2$ | $-a_4 b_1$ | $-a_4 b_2$ | $-a_4 b_3$ | $-a_4 b_4$ |
| $-b_1 a_1$ | $-b_1 a_2$ | $-b_1 a_3$ | $-b_1 a_4$ | $b_1^2$ | $b_1 b_2$ | $b_1 b_3$ | $b_1 b_4$ |
| $-b_2 a_1$ | $-b_2 a_2$ | $-b_2 a_3$ | $-b_2 a_4$ | $b_2 b_1$ | $b_2^2$ | $b_2 b_3$ | $b_2 b_4$ |
| $-b_3 a_1$ | $-b_3 a_2$ | $-b_3 a_3$ | $-b_3 a_4$ | $b_3 b_1$ | $b_3 b_2$ | $b_3^2$ | $b_3 b_4$ |
| $-b_4 a_1$ | $-b_4 a_2$ | $-b_4 a_3$ | $-b_4 a_4$ | $b_4 b_1$ | $b_4 b_2$ | $b_4 b_3$ | $b_4^2$ |

For tetrahedral solid elements, the first and second element contact faces have a triangular shape. the augmented terms would become 6×6 instead of 8×8.

Next, at action 122, nodal Joule heating potential is obtained by solving the stiffness matrix with well-known techniques (e.g., implicit FEA solution with equation solver). At action 124, the Joule heat rate power at each contact center is calculated from the nodal Joule heating potential with the following formula:

$$P_{jhr} = [\phi(C_a) - \phi(C_b)]^2 / r$$

$$P(A_i) = P(A_i) + a_i P_{jhr}/2 \text{ for } i=1,2,3,4$$

$$P(B_i) = P(B_i) + b_i P_{jhr}/2 \text{ for } i=1,2,3,4$$

where:
$P_{jhr}$ is Joule heat rate power at contact center between the first and second element contact face,
r is the local electrical resistance at contact center between the first and second element contact face,
$P(A_i)$ is the Joule heat rate power at respective corner nodes of the first element contact face, and
$P(B_i)$ is the Joule heat rate power at respective corner nodes of the second element contact face.

The Joule heat rate power is then distributed to respective corner nodes of the element contact faces in accordance with elemental coordinates at action 126. Next, the simulation time is incremented at action 128. The simulation time is checked with a predefined end-of-simulation criteria at decision 130. If the simulation has not ended, process 110 following the 'no' branch to action 114 repeating the actions described above until the decision 130 becomes true. Process 110 ends thereafter.

Once the numerical simulation results are obtained and numerically-calculated power-heat distributions and the numerically-calculated structural behaviors meet predefined criteria, physical RSW setup is configured to the set of time-dependent electrode forces and the corresponding set of time-dependent electrical current.

Figure 8:
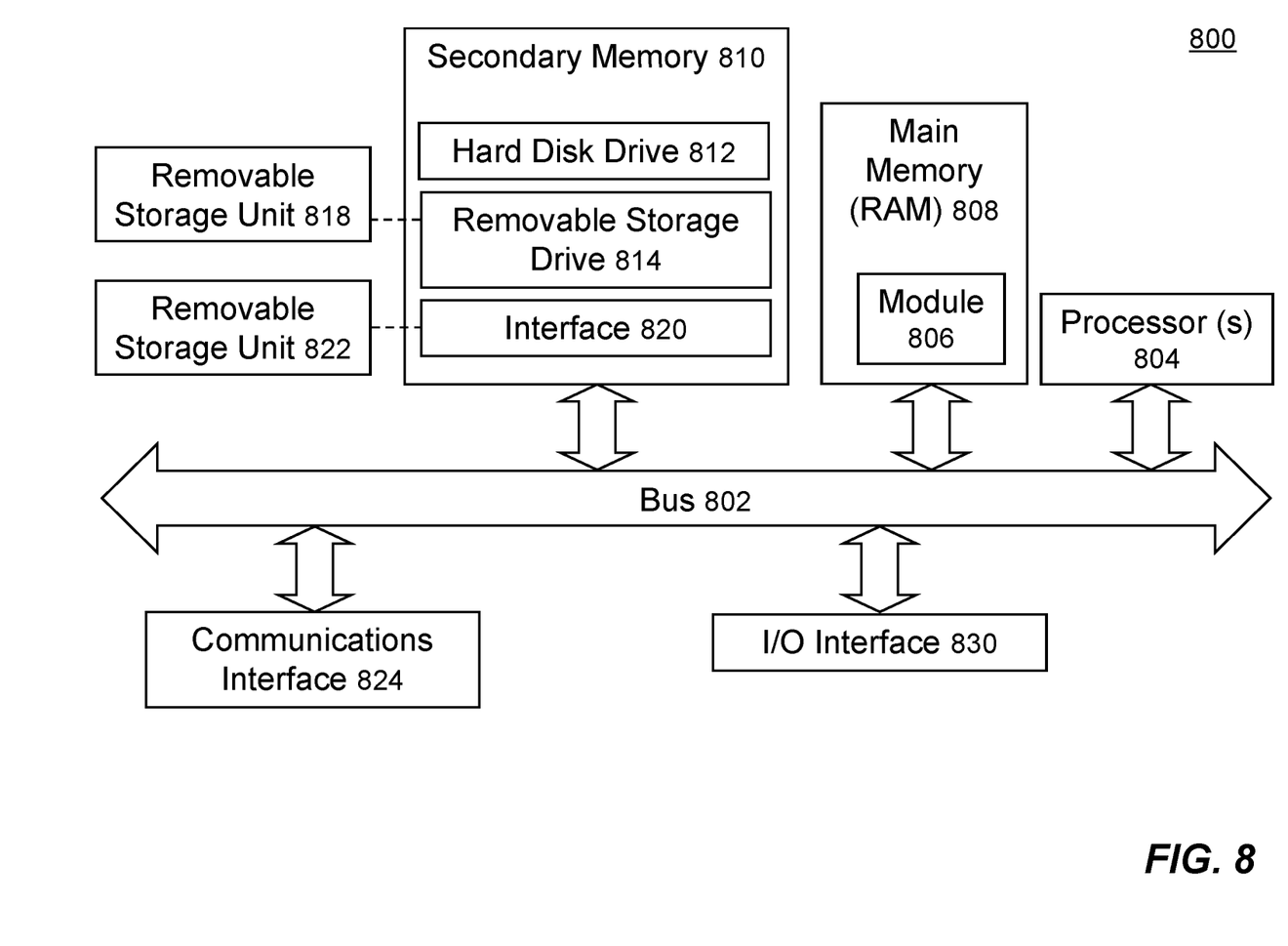
FIG. 8 is a function diagram showing salient components of a computer system, in which an embodiment of the invention may be implemented.

According to one aspect, the invention is directed towards one or more computer systems capable of carrying out the functionality described herein. An example of a computer system 800 is shown in FIG. 8. The computer system 800 includes one or more processors, such as processor 804. The processor 804 is connected to a computer system internal communication bus 802. Various software embodiments are described in terms of this example computer system. After reading this description, it will become apparent to a person skilled in the relevant art(s) how to implement the invention using other computer systems and/or computer architectures.

Computer system 800 also includes a main memory 808, preferably random access memory (RAM), and may also include a secondary memory 810. The secondary memory 810 may include, for example, one or more hard disk drives 812 and/or one or more removable storage drives 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 822 and interfaces 820 which allow software and data to be transferred from the removable storage unit 822 to computer system 800. In general, Computer system 800 is controlled and coordinated by operating system (OS) software, which performs tasks such as process scheduling, memory management, networking and I/O services.

There may also be a communications interface 824 connecting to the bus 802. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. The computer 800 communicates with other computing devices over a data network based on a special set of rules (i.e., a protocol). One of the common protocols is TCP/IP (Transmission Control Protocol/Internet Protocol) commonly used in the Internet. In general, the communication interface 824 manages the assembling of a data file into smaller packets that are transmitted over the data network or reassembles received packets into the original data file. In addition, the communication interface 824 handles the address part of each packet so that it gets to the right destination or intercepts packets destined for the computer 800. In this document, the terms "computer program medium" and "computer usable medium" are used to generally refer to media such as removable storage drive 814, and/or a hard disk installed in hard disk drive 812. These computer program products are means for providing software to computer system 800. The invention is directed to such computer program products.

The computer system 800 may also include an input/output (I/O) interface 830, which provides the computer system 800 to access monitor, keyboard, mouse, printer, scanner, plotter, and alike.

Computer programs (also called computer control logic) are stored as application modules 806 in main memory 808 and/or secondary memory 810. Computer programs may also be received via communications interface 824. Such computer programs, when executed, enable the computer system 800 to perform the features of the invention as discussed herein. In particular, the computer programs, when executed, enable the processor 804 to perform features of the invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. The application module 806, when executed by the processor 804, causes the processor 804 to perform the functions of the invention as described herein.

The main memory 808 may be loaded with one or more application modules 806 (e.g., finite element method) that can be executed by one or more processors 804 with or without a user input through the I/O interface 830 to achieve desired tasks. In operation, when at least one processor 804 executes one of the application modules 806, the results are computed and stored in the secondary memory 810 (i.e., hard disk drive 812). The result and/or status of the time-marching simulation (e.g., temperature distribution) is reported to the user via the I/O interface 830 either in a text or in a graphical representation to a monitor coupled to the computer.

Although the invention has been described with reference to specific embodiments thereof, these embodiments are merely illustrative, and not restrictive of, the invention. Various modifications or changes to the specifically disclosed example embodiments will be suggested to persons skilled in the art. Whereas hexahedral elements have been shown and described as solid elements, other type of solid elements can be used to achieve the same, for example, tetrahedral elements. Additionally, whereas rectangular element faces have been described and shown at contact interface, other types of element faces may be used for achieving the same, for example, triangular element face. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A method of configuring physical resistance spot welding (RSW) setup based on numerical simulation results comprising:
   receiving, in a computer system having a finite element analysis (FEA) application module installed thereon, a FEA model representing a RSW setup that contains first and second electrodes, and first and second workpieces, the FEA model containing a plurality of solid elements, the workpieces welded together at a location that the first and the second electrodes squeeze the workpieces; and
   obtaining numerically-calculated power-heat distributions and numerically-calculated structural behaviors of the workpieces using the FEA model with a set of time-dependent electrode forces and a corresponding set of time-dependent electrical current by performing following operations:
   detecting which solid element pairs are in contact;
   determining an overlapped contact area and a corresponding contact center between first and second element contact faces of each of the solid element pairs in contact;
   calculating respective elemental coordinates of the contact center in the first element contact face and in the second element contact face;
   updating an overall stiffness matrix of the FEA model by adding augmented terms for said each of the solid element pairs in contact, the augmented terms being a function of the overlapped contact area, local electrical resistance at the contact center and the respective elemental coordinates; and
   obtaining a set of nodal Joule heating potentials by solving the overall stiffness matrix;
   calculating a Joule heating rate power at the contact center from the nodal Joule heating potential at respective corner nodes along with the elemental coordinates; and
   distributing the Joule heating rate power to the respective corner nodes of the first and second element contact faces according to the respective elemental coordinates.

2. The method of claim 1, wherein said each solid element is associated with a corresponding set of temperature-dependent material properties.

3. The method of claim 1, said determining the overlapped contact area and the corresponding contact center further comprises determining a projection plane between the first element contact face and the second element contact face using respective normal vectors.

4. The method of claim 3, wherein the overlapped contact area comprises a polygon located on the projection plane and the contact center is the polygon's geometric center.

5. The method of claim 1, wherein said each of the solid element pairs in contact belong to one of three contact interfaces in the FEA model, the three contact interfaces are between the first electrode and the first workpiece, the first workpiece and second workpiece, and the second workpiece and the second electrode.

6. A system for numerically simulating resistance spot welding (RSW) setup comprising:
a main memory for storing computer readable code for a finite element analysis (FEA) application module;
at least one processor coupled to the main memory, said at least one processor executing the computer readable code in the main memory to cause the FEA application module to perform operations by a method of:
receiving a FEA model representing a RSW setup that contains first and second electrodes, and first and second workpieces, the FEA model containing a plurality of solid elements, the workpieces welded together at a location that the first and the second electrodes squeeze the workpieces; and
obtaining numerically-calculated power-heat distributions and numerically-calculated structural behaviors of the workpieces using the FEA model with a set of time-dependent electrode forces and a corresponding set of time-dependent electrical current by performing following operations:
detecting which solid element pairs are in contact;
determining an overlapped contact area and a corresponding contact center between first and second element contact faces of each of the solid element pairs in contact;
calculating respective elemental coordinates of the contact center in the first element contact face and in the second element contact face;
updating an overall stiffness matrix of the FEA model by adding augmented terms for said each of the solid element pairs in contact, the augmented terms being a function of the overlapped contact area, local electrical resistance at the contact center and the respective elemental coordinates; and
obtaining a set of nodal Joule heating potentials by solving the overall stiffness matrix;
calculating a Joule heating rate power at the contact center from the nodal Joule heating potential at respective corner nodes along with the elemental coordinates; and
distributing the Joule heating rate power to the respective corner nodes of the first and second element contact faces according to the respective elemental coordinates.

7. The system of claim 6, wherein said each solid element is associated with a corresponding set of temperature-dependent material properties.

8. The system of claim 6, said determining the overlapped contact area and the corresponding contact center further comprises determining a projection plane between the first element contact face and the second element contact face using respective normal vectors.

9. The system of claim 8, wherein the overlapped contact area comprises a polygon located on the projection plane and the contact center is the polygon's geometric center.

10. The system of claim 6, wherein said each of the solid element pairs in contact belong to one of three contact interfaces in the FEA model, the three contact interfaces are between the first electrode and the first workpiece, the first workpiece and second workpiece, and the second workpiece and the second electrode.

11. A non-transitory computer recordable storage medium containing computer instructions for numerically simulating resistance spot welding (RSW) setup, said computer instructions when executed on a computer system cause the computer system to perform operations of:
receiving, in a computer system having a finite element analysis (FEA) application module installed thereon, a FEA model representing a RSW setup that contains first and second electrodes, and first and second workpieces, the FEA model containing a plurality of solid elements, the workpieces welded together at a location that the first and the second electrodes squeeze the workpieces; and
obtaining numerically-calculated power-heat distributions and numerically-calculated structural behaviors of the workpieces using the FEA model with a set of time-dependent electrode forces and a corresponding set of time-dependent electrical current by performing following operations:
detecting which solid element pairs are in contact;
determining an overlapped contact area and a corresponding contact center between first and second element contact faces of each of the solid element pairs in contact;
calculating respective elemental coordinates of the contact center in the first element contact face and in the second element contact face;
updating an overall stiffness matrix of the FEA model by adding augmented terms for said each of the solid element pairs in contact, the augmented terms being a function of the overlapped contact area, local electrical resistance at the contact center and the respective elemental coordinates; and
obtaining a set of nodal Joule heating potentials by solving the overall stiffness matrix;
calculating a Joule heating rate power at the contact center from the nodal Joule heating potential at respective corner nodes along with the elemental coordinates; and
distributing the Joule heating rate power to the respective corner nodes of the first and second element contact faces according to the respective elemental coordinates.

12. The non-transitory computer recordable storage medium of claim 11, wherein said each solid element is associated with a corresponding set of temperature-dependent material properties.

13. The non-transitory computer recordable storage medium of claim 11, said determining the overlapped contact area and the corresponding contact center further comprises determining a projection plane between the first element contact face and the second element contact face using respective normal vectors.

14. The non-transitory computer recordable storage medium of claim 13, wherein the overlapped contact area comprises a polygon located on the projection plane and the contact center is the polygon's geometric center.

15. The non-transitory computer recordable storage medium of claim 11, wherein said each of the solid element pairs in contact belong to one of three contact interfaces in the FEA model, the three contact interfaces are between the first electrode and the first workpiece, the first workpiece and second workpiece, and the second workpiece and the second electrode.

* * * * *